Figure 1:
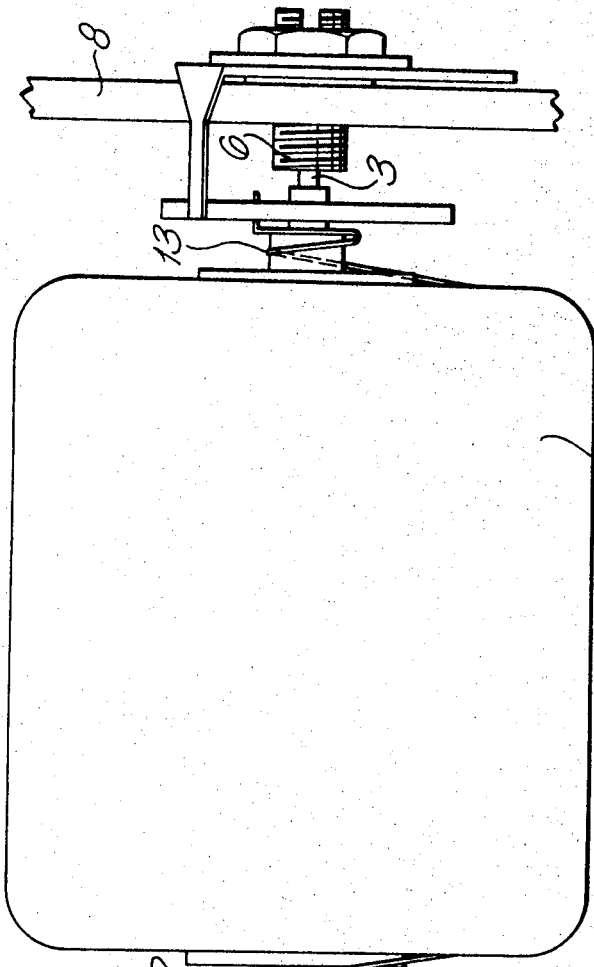

United States Patent
Langdon

[15] 3,674,968
[45] July 4, 1972

[54] ELECTRICAL CONTACT ASSEMBLY HAVING DAMPING MEANS

[72] Inventor: Thomas Edward Langdon, 10 Park Crescent, Elstree, England

[22] Filed: July 20, 1970

[21] Appl. No.: 56,287

[30] Foreign Application Priority Data

July 25, 1969 Great Britain.....................37,613/69

[52] U.S. Cl. ...................................200/166 H, 335/222
[51] Int. Cl. ...................................................H01h 1/50
[58] Field of Search ...............200/166 H, 166 C; 335/47, 54, 335/222, 193

[56] References Cited

UNITED STATES PATENTS

| | | | |
|---|---|---|---|
| 786,696 | 4/1905 | Vreeland | 335/222 x |
| 2,840,782 | 6/1958 | Ammon | 335/222 x |
| 3,406,339 | 10/1968 | Bibbings | 335/222 x |
| 3,395,349 | 7/1968 | Bajars | 335/222 x |
| 3,418,576 | 12/1968 | Dean | 335/222 x |
| 3,478,265 | 11/1969 | Sauser | 335/222 x |

Primary Examiner—H. O. Jones
Attorney—Baldwin, Wight & Brown

[57] ABSTRACT

An electrical contact for a conductive shaft such as a shaft for a moving coil in an electrical meter, the contact comprising a housing containing a mobile conductive medium such as mercury, which connects the shaft to an input or output conductor. The mobile conductive medium is normally retained within the housing by virtue of a small running clearance for the shaft. The contact is vibration proof within a range of acceleration forces and vibration frequencies Damping of the shaft may be effected by a liquid mobile conductive medium.

12 Claims, 3 Drawing Figures

PATENTED JUL 4 1972

3,674,968

ELECTRICAL CONTACT ASSEMBLY HAVING DAMPING MEANS

This invention relates to an electrical contact for rotary conductive shafts and more particularly to such a contact adapted for use with electrical meters.

In, for example, moving coil ammeters it is usual practice to mount a coil wound bobbin between shafts running in jewelled bearings. Electrical contact is made with each end of the coil through hair springs located about respective shafts, one end of each spring being attached to its respective shaft and the other end being rigidly mounted and firmly attached to a conductor supplying current to the coil via the spring. In such an arrangement each hair spring allows limited rotary movement of the coil and at the same time conducts current for displacing the coil against the return action of the spring. In another known construction taut bands are used in place of the hair springs. These known arrangements have the disadvantage that when used in an explosive atmosphere, should one of the current carrying hair springs or taut bands break leaving separated ends, relative movement of these ends may be sufficient to cause a spark to ignite the explosive atmosphere. Safety precautions may be taken by enclosing the moving coil ammeter in an explosionproof or flameproof housing but this leads to further cost and in some cases it is functionally undesirable.

One of the aims of the present invention is to provide an electrical contact particularly suitable for making an electrical connection with the shaft of, for example, a moving coil in an electrical meter, which contact is not subject to an explosion hazard and at the same time does not restrict the movement of the shaft in its bearing.

In accordance with the broadest aspect of this invention, an electrical contact for a conductive shaft, said shaft being movable relative said contact, comprises a housing arranged to accept the shaft or adjacent the shaft, the location of the shaft in or relative to the housing being such that a mobile conductive medium contained in the housing is retained between the shaft and the housing without said medium normally being able to escape from the housing, said medium making electrical contact either between the housing which is conductive and the shaft, or between an electrical conductor attached to the housing adjacent the mobile conductive medium and the shaft.

The mobile medium making contact between the shaft and a stationary conductor is preferably mercury, but it may be another conductive liquid or granulated conductive solid both of which are capable of maintaining electrical contact with the shaft and of not escaping from the housing. Suitable media other than mercury may be liquid carbon suspension, conductive greases or granulated conductive solids not liable to lose electrical contact with the rotary shaft.

In a preferred embodiment the electrical contact of this invention provides an explosion-proof or flame-proof electrical contact for an electrical meter, the shaft being one which is attached mechanically and electrically to a moving coil of the electrical meter. The shaft is mounted in a bearing within the housing and passes through an aperture in the housing. The space between the shaft and the housing is filled with mercury so as to make electrical contact between the conductive housing or the electrical conductor attached to the housing and the shaft. The clearance between the shaft and the aperture in the housing is such that the mercury is normally unable to escape from the housing due, it is thought, to various factors, including surface tensional forces and capillary action.

In the preferred embodiment the housing may be a conductive body having a central bore containing a jewelled bearing or bearings. The rotary shaft passes into the bore through the aperture in the body and is supported on the bearing(s), a chamber or chambers being formed between the shaft and the interior walls of the bore. Under normal circumstances of mechanical shock or vibration the mercury is retained within the chamber(s).

When the electrical contact is used in a temperature varying environment, allowances must be made for expansion of the mobile medium such that it is free to expand without escaping from the clearance.

Figure 3:
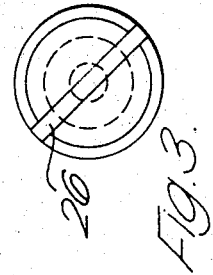
Figure 2:
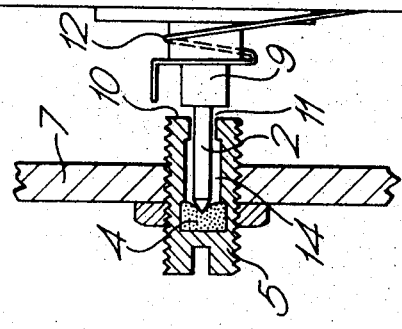

Exemplary embodiments will now be described with reference to the accompanying drawings in which:

FIG. 1 illustrates a side view of a moving coil meter and shows one of the bearing arrangements in side section, FIG. 2 illustrates a side sectional view of a bearing housing containing part of a shaft, and FIG. 3 is an end-on view of the housing shown in FIG. 2.

Referring to FIG. 1 which illustrates a side view of a moving coil meter, a coil wound bobbin 1 is fixed to shafts 2 and 3 respectively supported on bearings 4 (only one of which, i.e. that supporting shaft 2, is shown). Bearings 4 are located in conductive housings 5 and 6, respective bearings accommodating the ends of the shafts 2 and 3. Bearings 4 may be of known type, for example, jewel bearings. Housings 5 and 6 are supported, for example, by screw threads on the housings which engage tapped holes in fixed frame members 7 and 8. The ends of each housing 5 and 6 are slotted to accept a screwdriver blade. This allows adjustment of the distance between the housings and hence the bearings 4 to provide the correct end float on shafts 2 and 3.

A biasing member, such as a coil or hair spring is attached to the shaft 2, or 3, or to both, and fixed relative the shaft, to provide return bias when the coil wound bobbin 1 is displaced by an input current.

Considering the housings 5 and 6, but referring to housing 5 which is sectioned in FIG. 1 for the purpose of illustration and explanation, an aperture 11 allows the shaft 2 to pass into the housing 5 for location on its bearing 4. The bearing 4 is preferably a jewel bearing which therefore insulates the shaft from the conductive housing 5, the housing 5 being insulated from the sides of shaft 2 because of its clearance, i.e. the diameter of aperture 11 is greater than that of the shaft so that the shaft does not touch the sides of the aperture. Shafts 2 and 3 are electrically connected to leads 12 and 13 of a coil wound on the bobbin 1. Electrical contact is established between the housing 5 and shaft 2 by filling a chamber 14 formed between the shaft 2 and the inner surfaces of housing 5 with a conductive mobile medium such as mercury. Such a medium allows electrical contact to be made between the housing 5 and the coil lead 12, a similar contact being made between housing 6 and coil lead 13. Thus, if the housings 5 and 6 are electrically connected to input terminals to the moving coil meter, the moving coil may be supplied with input current for measurement. The mercury allows electrical contact to be maintained with the rotary shaft 2 (or 3) while allowing relatively free movement of the shaft 2 (or 3) in its bearing 4.

The clearance between the aperture walls adjacent the shaft 2 (or 3) must be such as to prevent mechanical friction therebetween and simultaneously prevent escape of the conductive mobile medium, e.g. mercury. Such a clearance may be determined by practice and is thought to be ascertainable by considering the properties of the conductive mobile medium such as its surface tension, and to the properties of the particular arrangement related to capillary forces in the clearance and partial vacuums in the housing 5 (or 6).

The shaft 2 may be stepped, or provided with a collar 9, an end face 10 of which is opposite and spaced from the corresponding end face of housing 5. The annular spacing between the collar 9 and the end face 10 is such as to assist in preventing escape of the mobile conductive medium (e.g. mercury), should any of the medium escape or tend to escape from the shaft clearance at aperture 11. A suitable shaft clearance for a shaft 2 of 0.015 in. diameter is 0.0075 in., the diameter of aperture 11 being 0.030 in. A suitable spacing between collar 9 and end face 10 is 0.025 in.

The preferred conductive mobile medium is mercury, but other mediums are envisaged such as liquid carbon suspensions, conductive greases, or granulated conductive solids not liable to lose electrical contact with the rotary shaft 2 (or 3) or escape from the clearance at the aperture in the housing 5 (or 6).

FIGS. 2 and 3 illustrate an alternative bearing arrangement in which a conductive housing contains bearings 16, 17 and 18 spaced apart by spacers 19 and 20. Bearing 18 is an end bearing for the rounded end of a shaft 21, and bearings 16 and 17 are sleeves supporting the shaft 21. All of the bearings are preferably jewel bearings. One or more sleeves 16 and 17 may be provided, two being preferable.

Chambers 22 and 23 are formed between the housing 15 and shaft 21, these chambers being filled with the conductive mobile medium, for example, mercury. Electrical contact is thereby made between the conductive housing and the shaft 21 and hence to a moving coil for example mounted on the shaft 21, and an input lead of the electrical meter containing the bearing arrangement of FIG. 2. The clearance between the sleeve bearings 16 and 17 (particularly bearing 16) allows rotary movement of the shaft without allowing the conductive mobile medium to escape from the housing 15. An aperture 24 through the end of the housing 15 and through a spacer 25 allows unrestricted rotary movement of the shaft.

FIG. 3 is an end-on view of the bearing arrangement shown in FIG. 2, and illustrates a slotted end 26 to accept a screwdriver for adjusting the position of housing 15 by threaded movement in a tapped supporting frame as previously described.

The use of a liquid mobile conductive medium (e.g. mercury) may also provide a form of damping for the shaft and in particular for a meter movement. Viscous drag will occur on for example, the shaft 2 of FIG. 1, the drag being increased by providing ridges, fins or other protuberances on the shaft 2.

The invention is not restricted to containing the conductive mobile medium in a bearing housing as explained above, as it is also possible to arrange a sleeve about the shaft supporting a moving coil of an electrical meter, the sleeve having a chamber containing the medium and having such a clearance about the shaft to prevent its escape from the chamber. Such sleeves could be fitted to the shafts of known meter movements in place of current carrying hair springs.

In a further modification, a container filled with the conductive mobile medium may be mounted adjacent a meter shaft and with such clearance therefrom as to prevent the escape of the medium from the container but allowing the medium to contact the shaft.

Referring to the drawings, it is not necessary for the housings 5 and 6 of FIG. 1, or 15 of FIG. 2 to be wholly conductive, as a conductor could be set in an insulating housing provided it contacted the conductive mobile medium and an electrical input for the shaft.

The principal advantage of the embodiments described above, particularly with respect to their use in electrical meters used in explosive atmospheres, is that stressed current carrying ligaments are dispensed with such as hair or coil springs which are liable to fracture under normal use. Electrical meters fitted with the electrical contact of this invention do not suffer from the hazard of a spark occurring between fractured ends of a current carrying hair or coil spring.

In order to demonstrate the utility of the invention, vibration tests were carried out on a meter movement fitted with an electrical contact as illustrated in FIG. 1 herein and including mercury as the mobile conductive medium. Such a movement was made and tested to the "Defence Specification DEF-62, Sealed Electrical Indicating Instruments" which specifies a range of vibration tests varying from 0.5 g acceleration at a vibration frequency of 10 c.p.s. to 5.8 g at 150 c.p.s. Even with the coil axis of the meter movement mounted vertically, the meter movement satisfactorily passed the tests. In fact only on exceeding the maximum test requirements, namely by using an acceleration of 6 g at a frequency of 750 c.p.s. did mercury emerge from the electrical contact.

What we claim is:

1. An explosion resistant electrical contact assembly comprising a conductive shaft, bearing means supporting opposite ends of said shaft for rotation, at least one of said bearing means including mounting means defining a chamber surrounding a portion of said shaft, said chamber having an opening through which said shaft extends, a mobile conductive medium within said chamber in direct electrical contact with said shaft, the relative positions of said shaft and said chamber being such that normally said mobile conductive medium would flow through said opening, and said opening being a restricted opening defined by a wall portion spaced from said shaft a distance sufficiently great to prevent contact between said shaft and said wall portion and sufficiently small to retain said mobile conductive medium.

2. An electrical contact assembly according to claim 1 in which the chamber is cylindrical and said wall edges form a lip defining said opening which encircles a cylindrical outer surface of said shaft, the spacing between the lip and said cylindrical outer surface being such that said mobile conductive medium is normally unable to escape therethrough.

3. An electrical contact according to claim 2 in which said spacing is substantially 0.0075 inches and said mobile conductive medium is mercury.

4. An electrical contact according to claim 3 in which the lip is an annular ridge of rectangular section with an inner surface circularly parallel to said cylindrical outer surface of said shaft.

5. An electrical contact according to claim 1 in which said mobile conductive medium is mercury.

6. An electrical contact assembly according to claim 1 in which said mobile conductive medium is a conductive grease not liable to lose electrical contact with said shaft.

7. An electrical contact according to claim 1 in which said mobile conductive medium is a liquid carbon suspension not liable to lose electrical contact with said shaft.

8. An electrical contact according to claim 1 in which said mobile conductive medium is a granulated conductive solid not liable to lose electrical contact with said shaft.

9. The electrical contact assembly of claim 1 wherein the other of said bearing means includes similar mounting means.

10. The electrical contact assembly of claim 1 wherein each of said bearing means is an end thrust bearing, and said shaft is supported solely by said end thrust bearings.

11. The electrical contact assembly of claim 1 wherein at least said one bearing means includes an end thrust bearing and a sleeve bearing, and said sleeve bearing defines said restricted opening.

12. The electrical contact assembly of claim 1 wherein said mounting means is in the form of a closed end tubular member having external means for adjustably mounting the same.

* * * * *